United States Patent
Lee et al.

(10) Patent No.: US 10,078,160 B2
(45) Date of Patent: Sep. 18, 2018

(54) VARIABLE LIQUID LENS SYSTEM

(71) Applicant: Samsung Electronics Co., Ltd., Suwon-si (KR)

(72) Inventors: Eun-sung Lee, Hwaseong-si (KR); Woon-bae Kim, Seoul (KR); Seung-wan Lee, Suwon-si (KR); Jong-hyeon Chang, Suwon-si (KR); Min-seog Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 14/503,559

(22) Filed: Oct. 1, 2014

(65) Prior Publication Data
US 2015/0131161 A1   May 14, 2015

(30) Foreign Application Priority Data

Nov. 11, 2013 (KR) ........................ 10-2013-0136541

(51) Int. Cl.
*G02B 3/14* (2006.01)
*G02B 26/00* (2006.01)

(52) U.S. Cl.
CPC ............. *G02B 3/14* (2013.01); *G02B 26/005* (2013.01)

(58) Field of Classification Search
CPC .......... G02B 3/12; G02B 3/14; G02B 26/004; G02B 26/005; G02B 2207/115; G09G 3/348

(Continued)

(56) References Cited

U.S. PATENT DOCUMENTS 6,081,388 A * 6/2000 Widl .................... G02B 3/0081
                                                        359/665
6,749,559 B1   6/2004 Kraas et al.
(Continued)

FOREIGN PATENT DOCUMENTS

JP   2002-214666 A   7/2002
JP   2007-233390 A   9/2007
(Continued)

OTHER PUBLICATIONS

Shaw, et al.; "Design and Analysis of an Asymmetrical Liquid-Filled Lens", Optical Engineering, Dec. 2007, vol. 46, No. 12, 8 pages total.
Weber, et al.; "A Tunable Optofluidic Silicon Optical Bench", Journal of Microelectromechanical Systems, Dec. 2012, vol. 21, No. 6, 8 pages total.

*Primary Examiner* — Ricky Mack
*Assistant Examiner* — Gary O'Neill
(74) *Attorney, Agent, or Firm* — Sughrue Mion, PLLC (57) ABSTRACT

A variable liquid lens system is provided. The variable liquid lens system includes a lens barrel comprising a wall and first and second ends, wherein the first and second ends are substantially transparent, at least one liquid lens disposed in the lens barrel and contacting the wall, the at least one liquid lens comprising a droplet, and a plurality of spaces containing fluid positioned on opposite sides of the at least one liquid lens inside the lens barrel. A plurality of first holes are provided in the wall at a position corresponding to the plurality of spaces. The at least one liquid lens is configured so that a position of the at least one liquid lens within the lens barrel is adjustable by adjusting amounts of the fluid contained in the plurality of spaces via the plurality of first holes.

15 Claims, 7 Drawing Sheets

(58) Field of Classification Search
USPC .................................... 359/665–667, 159.68
See application file for complete search history.

(56) References Cited

U.S. PATENT DOCUMENTS

| | | | |
|---|---|---|---|
| 7,580,195 | B2 | 8/2009 | Choi et al. |
| 7,859,741 | B2 | 12/2010 | Chikazawa et al. |
| 2007/0139785 | A1* | 6/2007 | Kuiper .................... G02B 3/14 359/630 |
| 2007/0217022 | A1* | 9/2007 | Kuiper .................... G02B 3/14 359/666 |
| 2007/0256943 | A1 | 11/2007 | Popovich et al. |
| 2009/0116118 | A1* | 5/2009 | Frazier .................... G02B 3/14 359/666 |
| 2010/0277923 | A1* | 11/2010 | Takai .................... F21V 14/003 362/296.01 |
| 2012/0081795 | A1 | 4/2012 | Choi et al. |
| 2013/0038944 | A1 | 2/2013 | Chang et al. |
| 2013/0077178 | A1 | 3/2013 | Lee et al. |

FOREIGN PATENT DOCUMENTS

| | | |
|---|---|---|
| JP | 2008-076833 A | 4/2008 |
| JP | 2008-180834 A | 8/2008 |
| KR | 10-2012-0035386 A | 4/2012 |
| KR | 10-2013-0016943 A | 2/2013 |
| KR | 10-2013-0033115 A | 4/2013 |

\* cited by examiner

FIG. 13

VARIABLE LIQUID LENS SYSTEM

RELATED APPLICATIONS

This application claims priority from Korean Patent Application No. 10-2013-0136541, filed on Nov. 11, 2013 in the Korean Intellectual Property Office, the disclosure of which is incorporated herein in its entirety by reference.

BACKGROUND

1. Field

One or more exemplary embodiments relate to a lens system, and more particularly, to a variable liquid lens system having a focal length adjusting function or a zooming function.

2. Description of the Related Art

In the field of medical imaging, there is increasing demand for information on the surface of tissue (human body tissue or skin tissue) and a technique for precisely capturing sectional images underneath these surfaces. In particular, most cancers occur under epithelial cells and then spread into dermal cells where blood vessels are present, and thus early detection of cancer may remarkably reduce damage due to the cancer. Internal tomograms may be obtained through the skin by using an existing imaging technique, such as magnetic resonance imaging (MRI), x-ray computed tomography (CT), ultrasonic imaging, or similar. However, due to the low resolution of the tomograms, early detection of cancer, which is small in size, is difficult. On the other hand, a recently introduced optical coherence tomography (OCT) technique uses light, unlike existing techniques of the related art. Thus, the OCT technique is expected to be useful in detecting early cancer with a size of about 50 µm to about 100 µm because the OCT technique has a resolution approximately ten times greater than that of the ultrasonic imaging technique even though its penetration into the skin is as low as about 2 mm to about 3 mm.

In the OCT technique, as well as in various fields where optical devices are used, there is demand for adjusting a position on which light is focused or the size of an irradiated light spot, and for miniaturizing such optical devices.

To accommodate such demand for the focal length adjusting function or the zooming function and miniaturization, a liquid lens is provided. A liquid lens does not involve any mechanical movement, and the focus and magnification thereof may be adjusted.

A liquid lens involves a liquid dispensing process. Due to recent advances in microfluidic technology, a technique for dispensing liquid at a picoliter (pL) level is under development together with various liquid-based devices.

SUMMARY

One or more exemplary embodiments provide a variable liquid lens system whose focal length may be adjusted or which has a zooming function, and which may be miniaturized by reducing an area occupied by a driving device as much as possible.

According to an aspect of an exemplary embodiment, there is provided a variable liquid lens system including a lens barrel which has a wall and two ends, of which at least the two ends are transparent so that light passes therethrough, at least one liquid lens disposed inside the lens barrel and contacting the wall, the at least one liquid lens comprises of a droplet, and a plurality of spaces which are positioned on opposite sides of the at least one liquid lens inside the lens barrel. A plurality of first holes are provided in the wall at positions corresponding to the plurality of spaces. The at least one liquid lens is configured so that a position of the at least one liquid lens within the lens barrel is adjustable by adjusting amounts of the fluid contained in the plurality of spaces via the plurality of first holes.

The at least one liquid lens may include first and second liquid lenses positioned apart from each other, the plurality of spaces may include first to third spaces positioned on one side of the first liquid lens, between the first and second liquid lenses, and on another side of the second liquid lens, and the first and second liquid lenses are configured so that positions of the first and second liquid lenses relative to each other are adjustable by adjusting amounts of the fluid contained in the first, second and third spaces.

During the adjustment of the positions of the first and second liquid lenses, the sum of variances in the amount of the fluid contained in the first to third spaces may be controlled to be zero.

During the adjustment of the positions of the first and second liquid lenses, the sum of variances in the volumes of the first to third spaces may be controlled to be zero.

The first and second liquid lenses may be formed of different types of liquid.

The first and second liquid lenses may include a different type of fluid than the fluid filling the first to third spaces.

The variable liquid lens system may further include an electrode at a portion of the wall corresponding to at least one of the first and second liquid lenses, and a curvature of the at least one liquid lens may be changed according to an electrowetting principle.

The wall may have a non-parallel wall area so that a curvature of at least one of the first and second liquid lenses is changed during the position adjustment.

A second hole may be provided in the wall at a position corresponding to the at least one of the first and second liquid lenses, and a distance between two lens surfaces of the at least one liquid lens may be adjusted by adding or subtracting the liquid to or from the at least one liquid lens.

The at least one liquid lens may consist of a different type of fluid than the fluid filling the spaces.

The wall may have a parallel-wall structure

The lens barrel may have a cylindrical shape.

The lens barrel may have a cylindrical shape, a truncated cone shape, or a combined shape of two or more truncated cones.

The variable liquid lens system may further include an electrode provided at a portion of the wall corresponding to the at least one liquid lens, and the curvature of the at least one liquid lens may be changed according to the electrowetting principle.

The wall may have a non-parallel wall area so that the curvature of the at least one liquid lens is changed during the adjustment of the position of the at least one liquid lens.

A second hole may be provided in the wall so that liquid flows to the at least one liquid lens, and the distance between two lens surfaces of the at least one liquid lens may be adjusted by adding or subtracting the liquid to or from the at least one liquid lens.

According to an aspect of another exemplary embodiment, there is provided a variable liquid lens system including a lens barrel including a wall and first and second ends, wherein the first and a second end are substantially transparent; at least one liquid lens disposed in the lens barrel and contacting the wall, the at least one liquid lens comprising a droplet; and a plurality of spaces positioned on opposite sides of the at least one liquid lens inside the lens barrel, wherein at least one first hole is provided in the wall at a position corresponding to the at least one liquid lens, and the at least one liquid lens is configured so that a distance between two lens surfaces of the at least one liquid lens is adjustable by adding or subtracting liquid to or from the at least one liquid lens via the at least one first hole.

According to an aspect of another exemplary embodiment, there is provided a variable liquid lens system including a lens barrel comprising first and second ends; a liquid lens inside the lens barrel and comprising a droplet; a plurality of spaces positioned between the liquid lens the first and second ends of the lens barrel; and at least one first hole provided in the wall corresponding to at least one first space among the plurality of spaces, wherein hydraulic pressure or air pressure of the at least one first space is configured to be adjusted by adjusting an amount of fluid contained in the first space using the at least one first hole, and the liquid lens is configured so that a position of the liquid lens is adjustable based on the adjustment of the hydraulic pressure or air pressure of the first space.

The liquid lens may further comprise a lens frame.

According to an aspect of another exemplary embodiment, there is provided a variable liquid lens system including a lens barrel comprising first and second ends; a liquid lens inside the lens barrel and comprising a droplet; a plurality of spaces positioned between the liquid lens the first and second ends of the lens barrel; and at least one first hole provided in the wall corresponding to the liquid lens, wherein at least one of a size and a shape of the liquid lens is configured to be adjusted by adding or subtracting liquid to or from the at least one liquid lens using the at least one first hole.

The liquid lens may further comprise a lens frame.

Here, the at least one liquid lens may include first and second liquid lenses positioned apart from each other, and a distance between two lens surfaces of at least one of the first and second liquid lenses may be adjusted by adding or subtracting the liquid to or from the at least one liquid lens.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Reference will now be made in detail to exemplary embodiments taken in conjunction with the accompanying drawings, wherein like reference numerals refer to like elements throughout. In this regard, exemplary embodiments may have different forms and should not be construed as being limited to the descriptions set forth herein. Accordingly, the exemplary embodiments described below, by referring to the figures, are merely provided as examples. As used herein, the term "and/or" includes any and all combinations of one or more of the associated listed items. Expressions such as "at least one of," when preceding a list of elements, modify the entire list of elements and do not modify the individual elements of the list.

A variable liquid lens system according to an exemplary embodiment includes at least one liquid lens which consists of a droplet having a contact angle with respect to a wall inside a lens barrel, and a plurality of spaces which are positioned on one side and another side of the at least one liquid lens. In the variable liquid lens system, by adjusting hydraulic or air pressures of the respective spaces, a position of the at least one liquid lens may be adjusted to change a focus. By adding or subtracting liquid to or from the at least one liquid lens, the distance between two lens surfaces of the at least one liquid lens may be adjusted to change the focus. When a plurality of liquid lenses are positioned apart from each other in the lens barrel, the variable liquid lens system may perform the zooming function as well as the variable focus function through adjustment of distances between the plurality of liquid lenses.

Such a variable liquid lens system according to an exemplary embodiment may perform the variable focus function and the zooming function. Therefore, when the variable liquid lens system is applied to an image scanning apparatus, it is possible to scan for a focus in the depth direction and perform the zooming function.

Such a variable liquid lens system according to an exemplary embodiment may be applied to various optical apparatuses, such as an optical coherence tomography (OCT) system, a lens auto-focusing apparatus, a lens-zooming apparatus, and so on.

Figure 1:
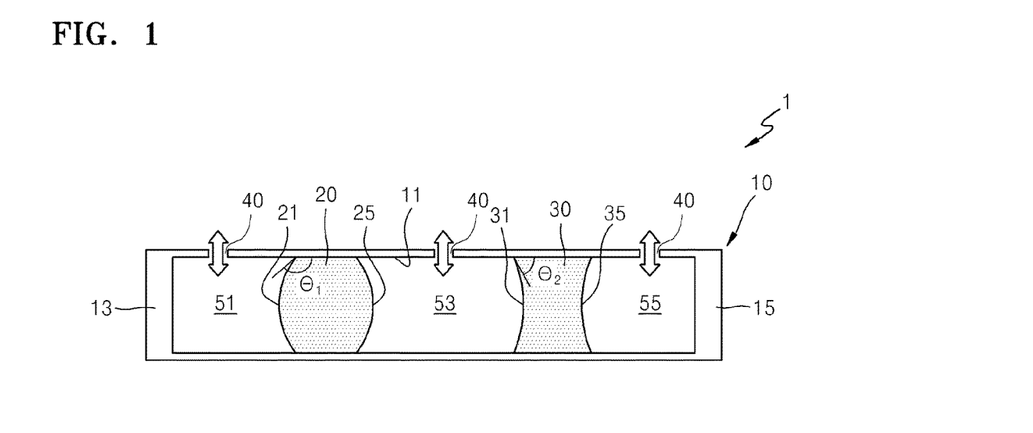
FIG. 1 schematically shows a variable liquid lens system according to an exemplary embodiment.

FIG. 1 schematically shows a variable liquid lens system 1 according to an exemplary embodiment.

Referring to FIG. 1, the variable liquid lens system 1 includes a lens barrel 10, at least one liquid lens (e.g., 20 and 30) which consists of a droplet having a contact angle with respect to a wall 11 inside the lens barrel 10, and a plurality of spaces (e.g., 51, 53, and 55) positioned on one side and another side of the liquid lens inside the lens barrel 10. The variable liquid lens system 1 may be prepared so that hydraulic pressures or air pressures of the respective spaces are adjusted by adjusting amounts of fluid contained in the plurality of spaces, and thus the position of the at least one liquid lens is adjusted to change a focus. Although the liquid lenses have been described as contacting the wall 11, this is just an example, and the at least one liquid lenses may comprise a lens frame (not shown). In this case, the lens frame may contact the wall 11 inside the lens barrel 10, and the droplet may contact the lens frame.

The lens barrel 10 has the wall 11 and two ends 13 and 15. Both ends 13 and 15 of the lens barrel 10 may be substantially transparent so that light may be input and output therethrough. The entirety of the lens barrel 10 may be formed of a transparent material, or only both ends 13 and 15 may be formed of a transparent material.

The lens barrel 10 may be formed so that the wall 11 has a parallel-wall structure. In other words, the lens barrel 10 may be formed so that the size of an internal cross-section thereof is uniform and does not vary in a lengthwise direction. Also, the internal cross-section of the lens barrel 10 may be formed to have, for example, a circular shape. As an example, the lens barrel 10 may have a cylindrical shape. In this case, the wall 11 of the lens barrel 10 has a parallel structure. When the wall 11 of the lens barrel 10 has such a parallel structure, a curvature of the at least one liquid lens may be kept uniform during the position adjustment.

As will be described later with reference to FIGS. 9 and 10, the lens barrel 10 may be formed so that the wall 11 has a non-parallel wall area. In other words, the lens barrel 10 may be formed so that the size of an internal cross-section varies in the lengthwise direction. Even in this case, the cross-section of the lens barrel 10 may be formed to have, for example, a circular shape. For example, the lens barrel 10 may have a truncated cone shape, or a combined shape of two or more truncated cones. In this case, the wall 11 of the lens barrel 10 has a non-parallel wall area. When the wall 11 of the lens barrel 10 has such a non-parallel wall area, the curvature of the at least one liquid lens moving through the non-parallel wall area may vary during the position adjustment.

A plurality of first holes 40 may be formed in the wall 11 of the lens barrel 10 so that the fluid flows to the plurality of spaces. As will be described later, at least one second hole (e.g., 70 of FIG. 6) may be further formed in the wall 11 of the lens barrel 10 so that the liquid may flow into the at least one liquid lens. By adding or subtracting the liquid to or from the at least one liquid lens through such a second hole, the distance between the two lens surfaces of the at least one liquid lens may be adjusted.

The at least one liquid lens comes in contact with the wall 11 inside the lens barrel 10. The at least one liquid lens may consist of a droplet which has a contact angle with respect to the wall 11. The at least one liquid lens and the spaces may be filled with different types of fluid.

As shown in FIG. 1, the at least one liquid lens may include first and second liquid lenses 20 and 30 which are positioned apart from each other. In this case, the plurality of spaces may include first to third spaces 51, 53, and 55 which are positioned on one side of the first liquid lens 20, between the first and second liquid lenses 20 and 30, and on the other side of the second liquid lens 30, respectively. The first space 51 on the one side of the first liquid lens 20 may be positioned between the first end 13 of the lens barrel 10 and the first liquid lens 20. The third space 53 on the other side of the second liquid lens 30 may be positioned between the second end 15 of the lens barrel 10 and the second liquid lens 30.

When the at least one liquid lens includes the first and second liquid lenses 20 and 30, and the plurality of spaces include the first to third spaces 51, 53, and 55 as shown in FIG. 1, the first holes 40 may be respectively formed at portions of the wall 11 corresponding to the first to third spaces 51, 53, and 55. One or a plurality of the first holes 40 may be formed at each of the portions of the wall 11 corresponding to the first to third spaces 51, 53, and 55. FIG. 1 shows an example of a case where the first holes 40 are formed at the portions of the wall 11 corresponding to the first to third spaces 51, 53, and 55 in a one-to-one fashion. In addition to the plurality of first holes 40 respectively formed at the portions of the wall 11 corresponding to the first to third spaces 51, 53, and 55, a second hole may be formed in the wall 11 so that the liquid flows to at least one of the first and second liquid lenses 20 and 30. (See, e.g., second hole 70 of FIG. 6) By forming the second hole, the variable liquid lens system 1 may be prepared so that the distance between the two lens surfaces of a liquid lens is adjusted by adding or subtracting the liquid to or from the liquid lens. Although a plurality of first holes 40 may correspond to the plurality of spaces 51, 53, and 55, this is only an example, and a single first hole or a plurality of first holes 40 may correspond to fewer than all of the plurality of spaces 51, 53, and 55.

The first liquid lens 20 may have a contact angle of, for example, θ1 with respect to the wall 11, and the second liquid lens 30 may have a contact angle of, for example, θ2 with respect to the wall 11. FIG. 1 shows an example in which the first liquid lens 20 has two lens surfaces 21 and 25 and is formed as a convex lens, and the second liquid lens 30 has two lens surfaces 31 and 35 and is formed as a concave lens. Although the first and second liquid lenses 20 and 30 are formed as a convex lens and a concave lens, respectively, this is only an example, and first and second liquid lenses may be formed as various types. The contact angle of the first liquid lens 20 and that of the second liquid lens 30 may vary according to the type of liquid used or the type or level of an impurity added to the liquid. To determine the contact angle of the first liquid lens 20 and that of the second liquid lens 30, the wall 11 inside the lens barrel 10 may be subjected to surface treatment.

Positions of the first and second liquid lenses 20 and 30 relative to each other may be adjusted by adjusting the amounts of the fluid contained in the first to third spaces 51, 53, and 55. Here, the fluid may include gas or liquid. When the fluid is gas, by adjusting the amounts of the fluid contained in the first to third spaces 51, 53, and 55, the air pressures of the first to third spaces 51, 53, and 55 are adjusted, and the positions of the first and second liquid lenses 20 and 30 are adjusted so that a focus may be changed, and the zooming function may be performed. When the fluid is liquid, by adjusting the amounts of the fluid contained in the first to third spaces 51, 53, and 55, the hydraulic pressures of the first to third spaces 51, 53, and 55 are adjusted, and the positions of the first and second liquid lenses 20 and 30 are adjusted so that the focus may be changed, and the zooming function may be performed as occasion demands.

When the wall 11 of the lens barrel 10 has a parallel-wall structure as shown in FIG. 1, the curvatures of the respective first and second liquid lenses 20 and 30 may be kept uniform during the position adjustment. When the wall 11 of the lens barrel 10 has a non-parallel wall area in the structure in which the at least one liquid lens includes the first and second lenses 20 and 30 apart from each other, at least one of the first and second liquid lenses 20 and 30 may vary in curvature during the position adjustment.

The liquid of the first and second liquid lenses 20 and 30 may be of the same type or different types. Also, the first and second liquid lenses 20 and 30 may consist of a different type of fluid than that which fills the first to third spaces 51, 53, and 55.

A case where the at least one liquid lens includes the first and second liquid lenses 20 and 30, and the plurality of spaces include the first to third spaces 51, 53, and 55 has been described above with reference to FIG. 1. However, this is merely an example, and exemplary embodiments are not limited thereto. For example, the number of liquid lenses may be three or more, and the number of spaces may increase accordingly.

Figure 2:
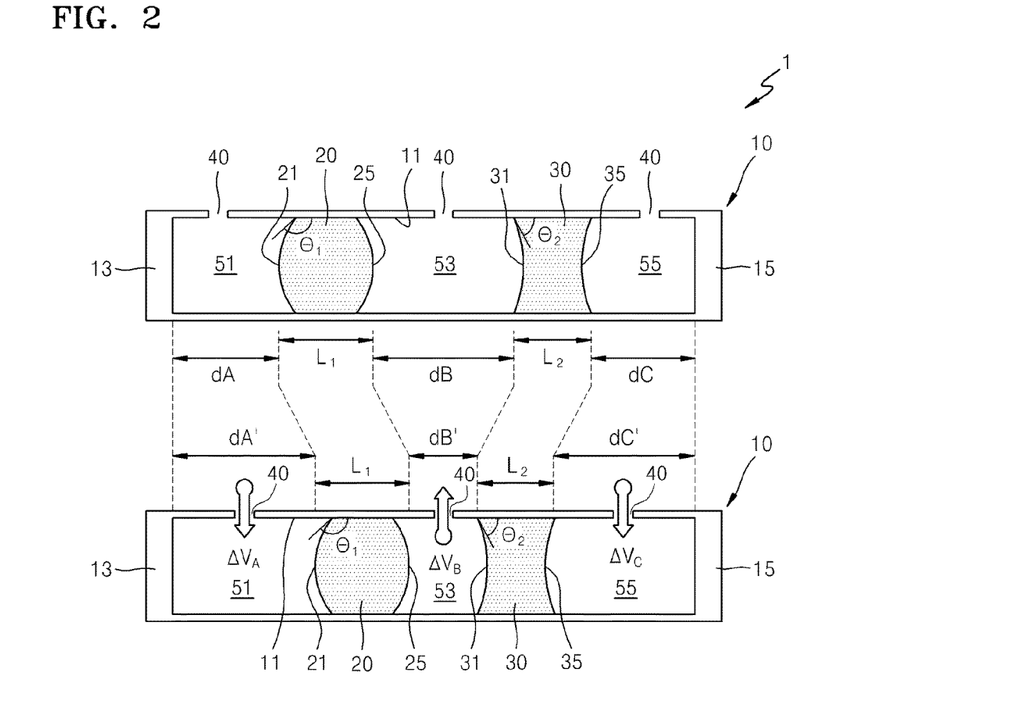
FIG. 2 illustrates the operation of adjusting the distance between first and second liquid lenses in the variable liquid system of FIG. 1 by adjusting the amounts of fluid contained in first to third spaces.

FIG. 2 illustrates the operation of adjusting the distance between the first and second liquid lenses 20 and 30 in the variable liquid system 1 of FIG. 1 by adjusting the amounts of fluid contained in the first to third spaces 51, 53, and 55.

It is assumed that, before position adjustment, the width of the first space 51 is dA, the width of the second space 53 is dB, and the width of the third space 55 is dC. For example, when the amounts of fluid in the first and third spaces 51 and 55 are increased, and the amount of the fluid in the second space 53 is reduced, the width of the first space 51 is increased to dA', the width of the second space 53 is reduced to dB', and the width of the third space 55 is increased to dC'. In other words, the first liquid lens 20 moves toward the second liquid lens 30, and the second liquid lens 30 moves toward the first liquid lens 20, and the distance between the first and second liquid lenses 20 and 30 is reduced from dB to dB'. At this time, a space L1 between the two surface lenses 21 and 25 of the first liquid lens 20 and a space L2 between the two surface lenses 31 and 35 of the second liquid lens 30 may be each kept uniform as exemplified in FIGS. 1 and 2.

During the position adjustment, the sum of variances in the volumes of the fluid contained in the first to third spaces 51, 53, and 55 may be controlled to be zero. In other words, when the flow quantities of the fluid in the first to third spaces 51, 53, and 55 through the first holes 40 formed in the wall 11 are $Q_A$, $Q_B$, and $Q_C$ respectively, the variable liquid lens system 1 may be controlled so that $Q_A*t+Q_B*t+Q_C*t=0$ (where t is time) is satisfied.

In addition, during the position adjustment, the sum of variances in the volumes of the first to third spaces 51, 53, and 55 may be controlled to be zero. In other words, when variances in the volumes of the first to third spaces 51, 53, and 55 are $\Delta V_A$, $\Delta V_B$, and $\Delta V_C$ respectively, the variable liquid lens system 1 may be controlled so that $\Delta V_A+\Delta V_B+\Delta V_C=0$ is satisfied. In this case, when the wall 11 has a parallel-wall structure as shown in FIGS. 1 and 2, $\Delta dA+\Delta dB+\Delta dC=0$ may be satisfied. Here, $\Delta dA=dA'-dA$, $\Delta dB=dB'-dB$, and $\Delta dC=dC'-dC$.

Various exemplary embodiments of a variable liquid lens system will be described below.

Figure 3:
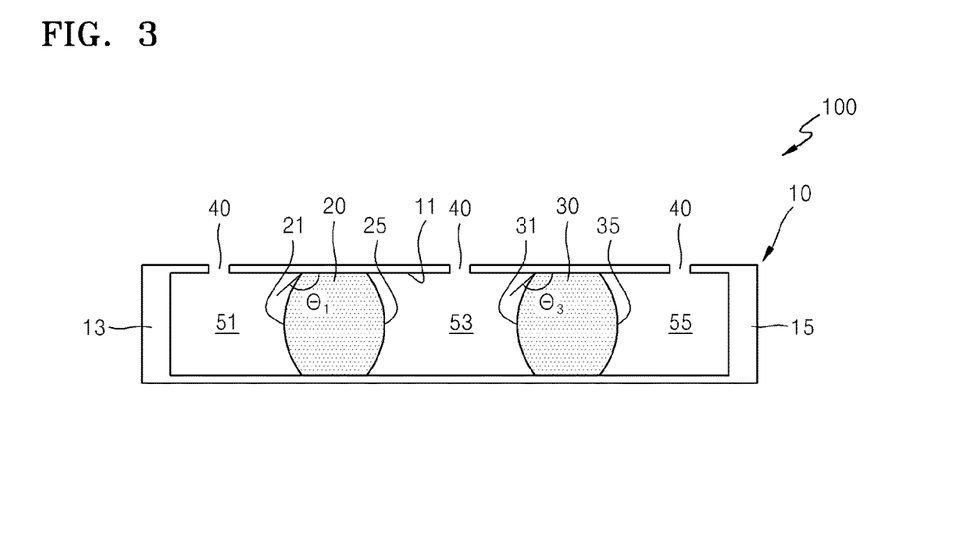
FIGS. 3 to 5 schematically show variable liquid lens systems according to other exemplary embodiments.

FIG. 3 shows a variable liquid lens system 100 according to another exemplary embodiment. In the example of FIG. 3, the second liquid lens 30 is a convex lens having a contact angle of θ3 with respect to the wall 11, unlike the variable liquid lens system 1 of FIG. 1. As shown in FIG. 3, the first and second liquid lenses 20 and 30 may be convex lenses.

Figure 4:
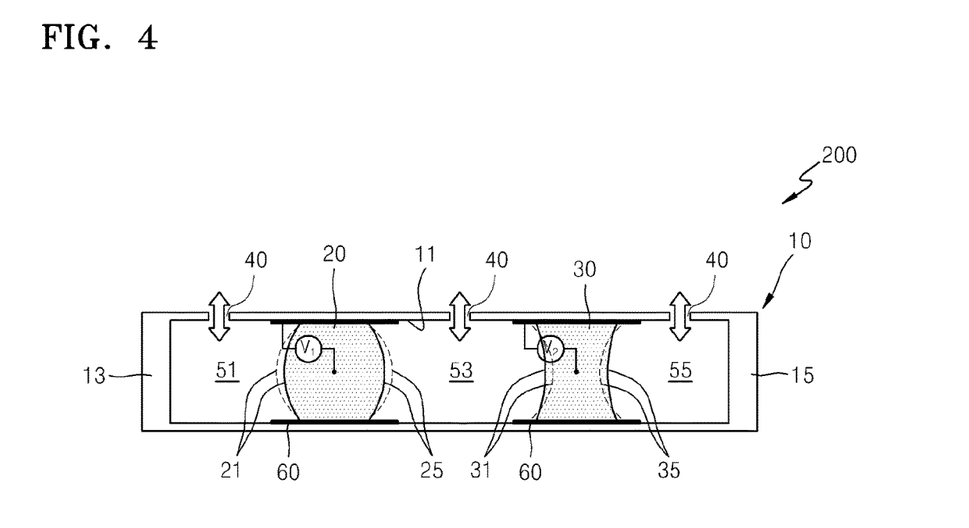

FIG. 4 shows a variable liquid lens system 200 according to another exemplary embodiment. Compared to the variable liquid lens system 1 of FIG. 1, the variable liquid lens system 200 further includes an electrode 60 at a portion of the wall 11 corresponding to at least one of the first and second liquid lenses 20 and 30 so that the curvature of the liquid lens is changed according to an electrowetting principle. FIG. 4 shows an example in which electrodes 60 are formed at portions of the wall 11 respectively corresponding to the first and second liquid lenses 20 and 30 so that the curvatures of the respective first and second liquid lenses 20 and 30 are changed according to the electrowetting principle. Alternatively, an electrode 60 may be prepared to change the curvature of only one of the first and second liquid lenses 20 and 30 according to the electrowetting principle. In FIG. 4, solid lines indicate the two lens surfaces 21 and 25 of the first liquid lens 20 before a change in curvature, and dotted lines indicate the two lens surfaces 21 and 25 of the first liquid lens 20 after the curvature is changed due to the operation of the electrodes 60 according to the electrowetting principle. Also, in FIG. 4, solid lines indicate the two lens surfaces 31 and 35 of the second liquid lens 30 before the change in curvature, and dotted lines indicate those after the curvature is changed due to the operation of the electrodes 60 according to the electrowetting principle.

When the electrodes 60 are prepared to change the curvatures of liquid lenses according to the electrowetting principle as in FIG. 4 and other exemplary embodiments which will be described later, the first and second liquid lenses 20 and 30 may consist of, for example, polar liquid, and the contact angles of the first and second liquid lenses 20 and 30 may be changed by an electric field formed by the electrodes 60 so that the curvatures are changed. The electrodes 60 may have a structure which is fabricated by forming an electrode pattern on the wall 11 inside the lens barrel 10 and coating the electrode pattern with an insulating material.

Figure 5:
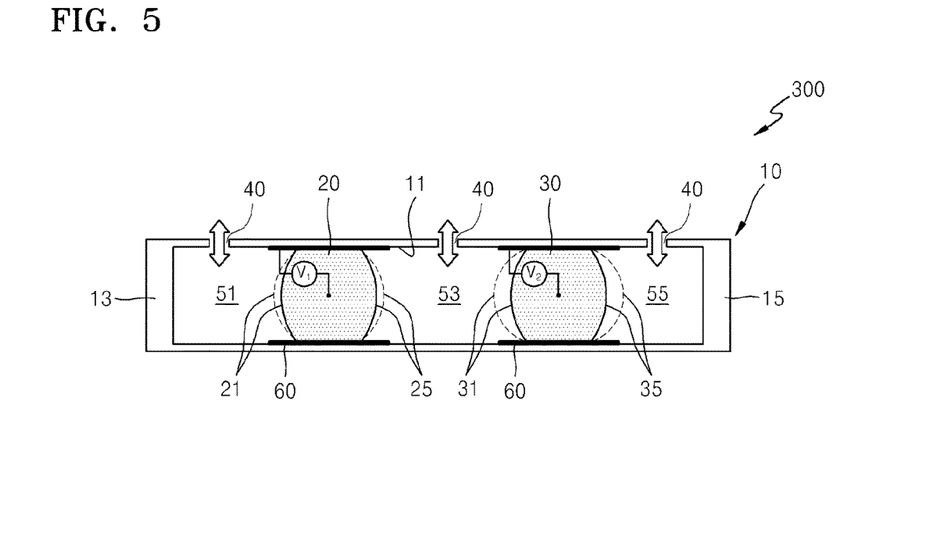

FIG. 5 shows a variable liquid lens system 300 according to another exemplary embodiment. The variable liquid lens system 300 has a structure in which the variable liquid lens system 100 of FIG. 3 and the variable liquid lens system 200 of FIG. 4 are combined. The second liquid lens 30 may be a convex lens having a contact angle with respect to the wall 11, and an electrode 60 may be further prepared at a portion of the wall 11 corresponding to at least one of the first and second liquid lenses 20 and 30, so that the curvature of the liquid lens may be changed according to the electrowetting principle. FIG. 5 shows an example in which electrodes 60 are formed at portions of the wall 11 corresponding to the respective first and second liquid lenses 20 and 30 so that the curvatures of the respective first and second liquid lenses 20 and 30 are changed according to the electrowetting principle. Alternatively, an electrode 60 may be prepared to change the curvature of only one of the first and second liquid lenses 20 and 30 according to the electrowetting principle.

Figure 6:
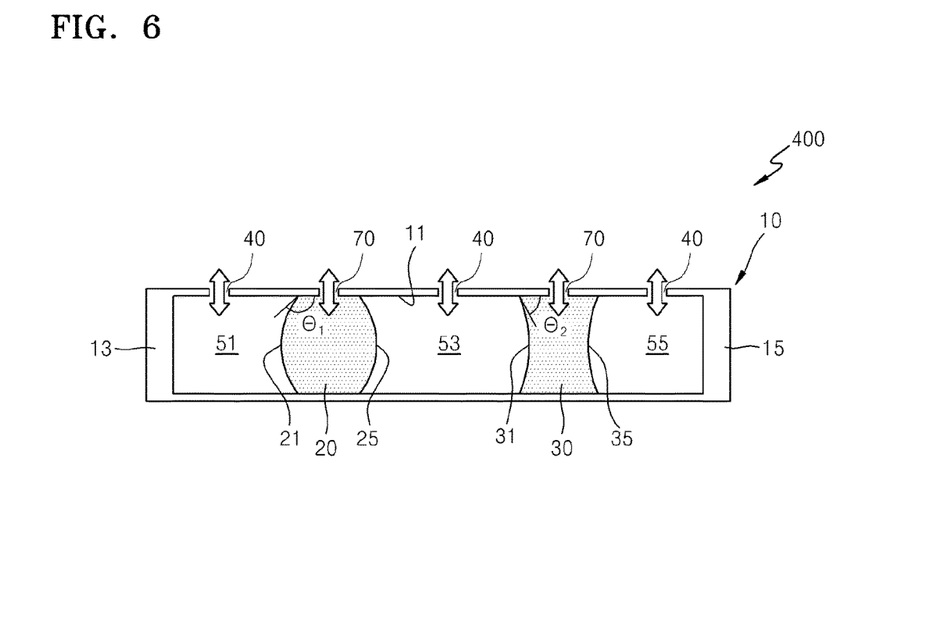
FIG. 6 schematically shows a variable liquid lens system according to another exemplary embodiment.

FIG. 6 shows a variable liquid lens system 400 according to another exemplary embodiment. The variable liquid lens system 400 is different from the variable liquid lens system 1 of FIG. 1 in that a second hole 70 is further formed in the wall 11 of the lens barrel 10 so that fluid may flow to at least one of the first and second liquid lenses 20 and 30. FIG. 6 shows an example in which second holes 70 have been respectively formed at portions of the wall 11 corresponding to the first and second liquid lenses 20 and 30 so that the liquid may be added to or subtracted from the respective first and second liquid lenses 20 and 30. Alternatively, a second hole 70 may be formed to add or subtract the liquid to or from only one of the first and second liquid lenses 20 and 30.

When the liquid is added to or subtracted from, for example, the first and second liquid lenses 20 and 30 through the second holes 70, the distance between the two lens surfaces 21 and 25 of the first liquid lens 20 may be adjusted, and the distance between the two lens surfaces 31 and 35 of the second liquid lens 30 may be adjusted.

In other words, when the volume of at least one of the first and second liquid lenses 20 and 30 is changed by adding or subtracting the liquid to or from the liquid lens, the focus of the variable liquid lens system 400 may be changed, and the zooming function may be performed. While the liquid is added or subtracted, the curvatures of the two lens surfaces of the liquid lens may be kept uniform. For example, in a case where the liquid is allowed to be added to or subtracted from each of the first and second liquid lenses 20 and 30, while the liquid is added or subtracted, the curvatures of the two lens surfaces 21 and 25 of the first liquid lens 20 may be kept uniform, and the curvatures of the two lens surfaces 31 and 35 of the second liquid lens 30 may also be kept uniform.

Figure 7:
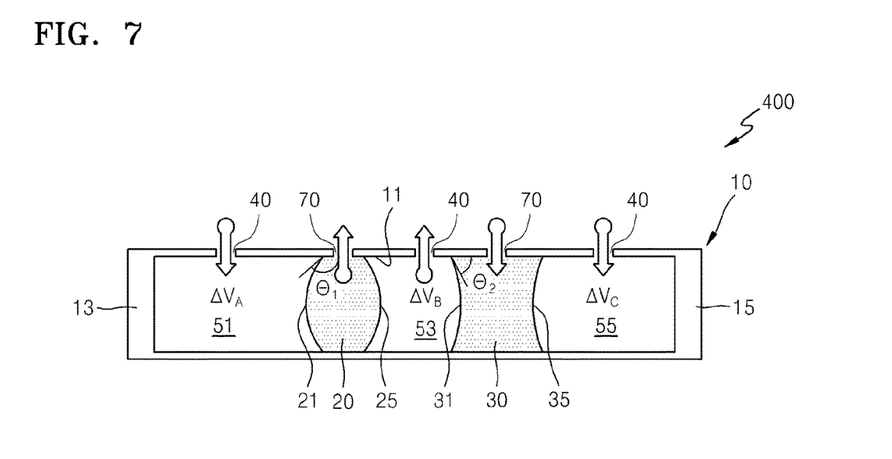
FIG. 7 shows changes in the volumes of first and second liquid lenses when liquid is subtracted from the first liquid lens and added to the second liquid lens in the variable liquid lens system of FIG. 6.

FIG. 7 shows variances in the volumes of the first and second liquid lenses 20 and 30 in the variable liquid lens system 400 of FIG. 6 when the liquid is subtracted from the first liquid lens 20 and added to the second liquid lens 30. FIG. 7 shows an operational state when the amounts of fluid contained in the first to third spaces 51, 53, and 55 are adjusted to adjust the distance between the first and second liquid lenses 20 and 30 and also change the volumes of the first and second liquid lenses 20 and 30. In other words, FIG. 7 shows an example of an operational state in which the volumes of the first and second liquid lenses 20 and 30 are additionally changed, further to the operational state of FIG. 2.

As illustrated in FIGS. 6 and 7, by adjusting the position of at least one of the first and second liquid lenses 20 and 30 and also the distance between the two lens surfaces of at least one of the first and second liquid lenses 20 and 30, the focal length adjusting function or the zooming function of the variable liquid lens system 400 may be performed.

Figure 8:
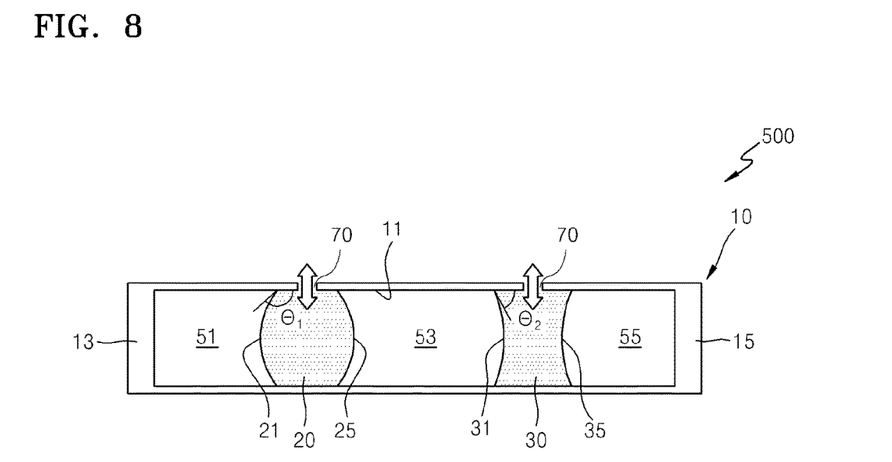
FIGS. 8 to 13 schematically show variable liquid lens systems according to other exemplary embodiments.

FIG. 8 schematically shows a variable liquid lens system 500 according to another exemplary embodiment. The variable liquid lens system 500 is different from the variable liquid lens system 1 of FIG. 1 and the variable liquid lens system 400 of FIG. 6 in that only a second hole 70 is prepared in the wall 11 of the lens barrel 10 without the first holes 40 so that the liquid is added to or subtracted from at least one of the first and second liquid lenses 20 and 30. As an example, FIG. 8 shows a case where second holes 70 have been respectively formed at portions of the wall 11 corresponding to the first and second liquid lenses 20 and 30 so that the liquid may be added to or subtracted from the respective first and second liquid lenses 20 and 30.

Even when only the second holes 70 are prepared as in FIG. 8, the distance between two lens surfaces may be adjusted by adding or subtracting the liquid to or from the first and second liquid lenses 20 and 30. At the same time, according to such an adjustment of the distance between the two lens surfaces, it is possible to adjust the distance between the first end 13 of the lens barrel 10 and the first liquid lens 20, the distance between the second end 15 of the lens barrel 10 and the second liquid lens 30, the distance between the first and second liquid lenses 20 and 30, and so on. The position adjustment ranges of the first and second liquid lenses 20 and 30 may be smaller than those of FIG. 6 where the positions of the first and second liquid lenses 20 and 30 are adjusted by adjusting the amounts of the fluid in the first to third spaces 51, 53, and 55 and adding or subtracting the liquid to or from the first and second liquid lenses 20 and 30.

Figure 9:
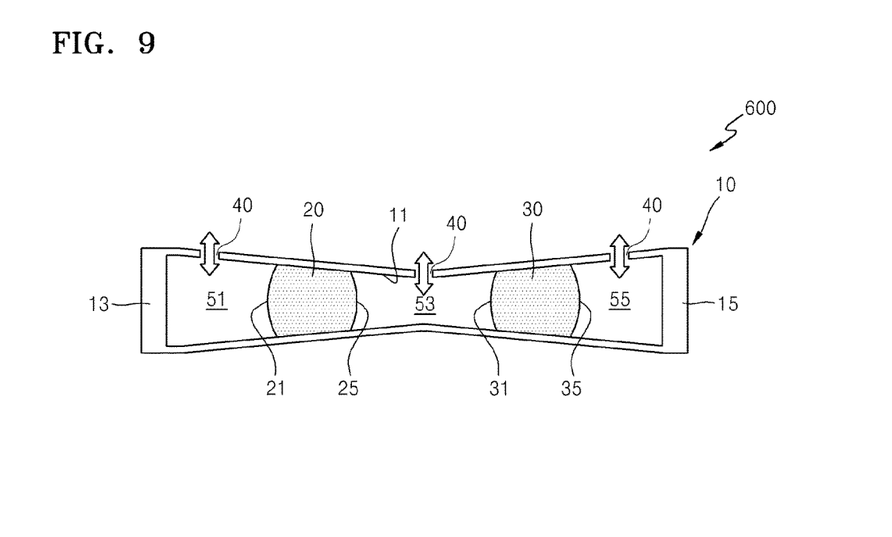

FIG. 9 schematically shows a variable liquid lens system 600 according to another exemplary embodiment. The variable liquid lens system 600 is different from the variable liquid lens system 100 of FIG. 3 in that the wall 11 of the lens barrel 10 has a non-parallel wall area to change the curvature of at least one of the first and second liquid lenses 20 and 30 during position adjustment.

In other words, as exemplified in FIG. 9, the wall 11 may be formed so that the size of a cross-section varies in the length direction. In this case also, the internal cross-section of the lens barrel 10 may be formed to have, for example, a circular shape. As a non-limiting example, the lens barrel 10 may have a truncated cone shape, or a combined shape of two or more truncated cones. In this case, the wall 11 of the lens barrel 10 has a non-parallel wall area. When the wall 11 of the lens barrel 10 has such a non-parallel wall area, the curvature of a liquid lens moving through the non-parallel wall area may vary during position adjustment.

FIG. 9 shows an example of the lens barrel 10 having, for example, a combined structure of two truncated cones in which the size of an internal cross-section of the lens barrel 10 decreases toward a middle portion between the first and second liquid lenses 20 and 30. In the example shown in FIG. 9, the first and second liquid lenses 20 and 30 are convex lenses, but any one of the first and second liquid lenses 20 and 30 may be a concave lens.

As exemplified in FIG. 9, when each of the first and second liquid lenses 20 and 30 comes in contact with the non-parallel wall area, the position of the first or second liquid lens 20 or 30 is moved by adjusting the amounts of the fluid in the first to third spaces 51, 53, and 55, and during such a position adjustment, the curvature of at least one of the first and second liquid lenses 20 and 30 is changed due to the non-parallel structure of the wall 11.

Figure 10:
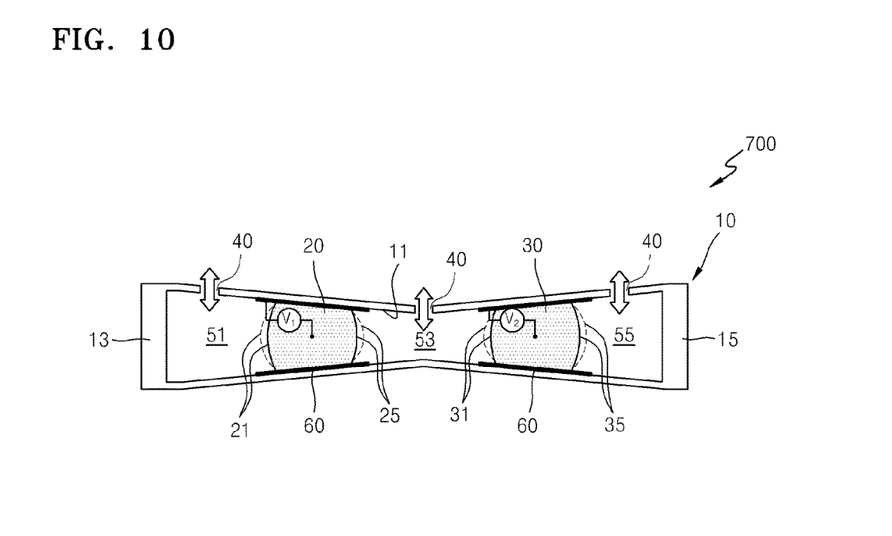

FIG. 10 schematically shows a variable liquid lens system 700 according to another exemplary embodiment. Compared to the variable liquid lens system 600 of FIG. 9, the variable liquid lens system 700 further includes an electrode 60 at a portion of the wall 11 corresponding to at least one of the first and second liquid lenses 20 and 30 so that the curvature of the liquid lens may be changed according to the electrowetting principle as well as the non-parallel structure of the wall 11. FIG. 10 shows an example in which electrodes 60 are formed at portions of the wall 11 respectively corresponding to the first and second liquid lenses 20 and 30 so that the curvatures of the respective first and second liquid lenses 20 and 30 may be changed according to the electrowetting principle as well as position movement of the first and second liquid lenses 20 and 30. Alternatively, an electrode 60 may be prepared to change the curvature of only one of the first and second liquid lenses 20 and 30 according to the electrowetting principle.

The variable liquid lens systems 600 and 700, in which the wall 11 of the lens barrel 10 is formed into the non-parallel structure to change the curvature of a liquid lens as described with reference to FIGS. 9 and 10, may further include at least one second hole 70 in the wall 11 so that the distance between the two lens surfaces of at least one of the first and second liquid lenses 20 and 30 is adjusted by adding or subtracting the liquid to or from the liquid lens. The variable liquid lens systems 600 and 700 in which the wall 11 of the lens barrel 10 is formed into the non-parallel structure to change the curvature of a liquid lens may only include a second hole 70 in the wall 11 without the first holes 40 so that the distance between the two lens surfaces of at least one of the first and second liquid lenses 20 and 30 is adjusted by adding or subtracting the liquid to or from the liquid lens, and thus the position of the liquid lens may be adjusted.

Cases where the variable liquid lens systems 1, 100, 200, 300, 400, 500, 600, and 700 according to the various exemplary embodiments include a plurality of liquid lenses apart from each other, for example, the first and second liquid lenses 20 and 30 have been described and illustrated above with reference to FIGS. 1 to 10. However, a variable liquid lens system according to an exemplary embodiment is not limited to the variable liquid lens systems 1, 100, 200, 300, 400, 500, 600, and 700 including a plurality of liquid lenses apart from each other, and may include a single liquid lens.

Figure 11:
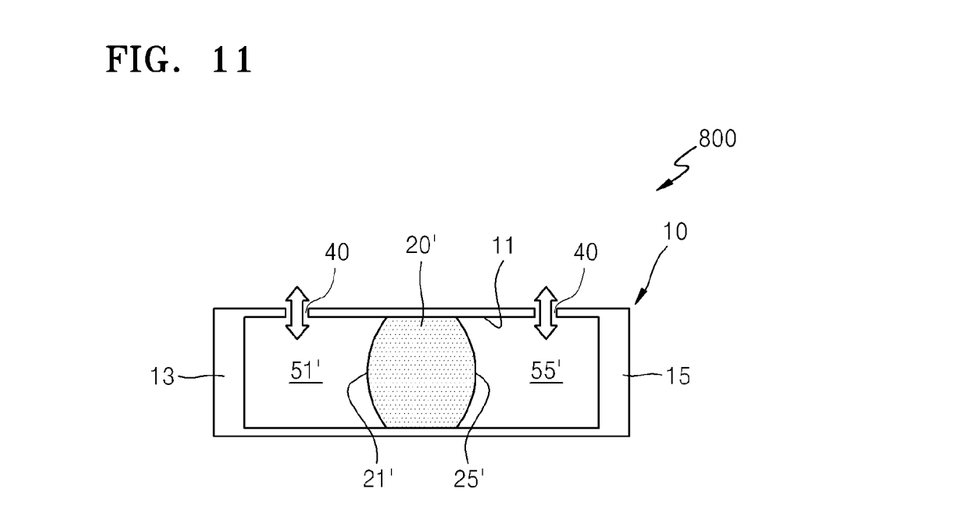
Figure 12:
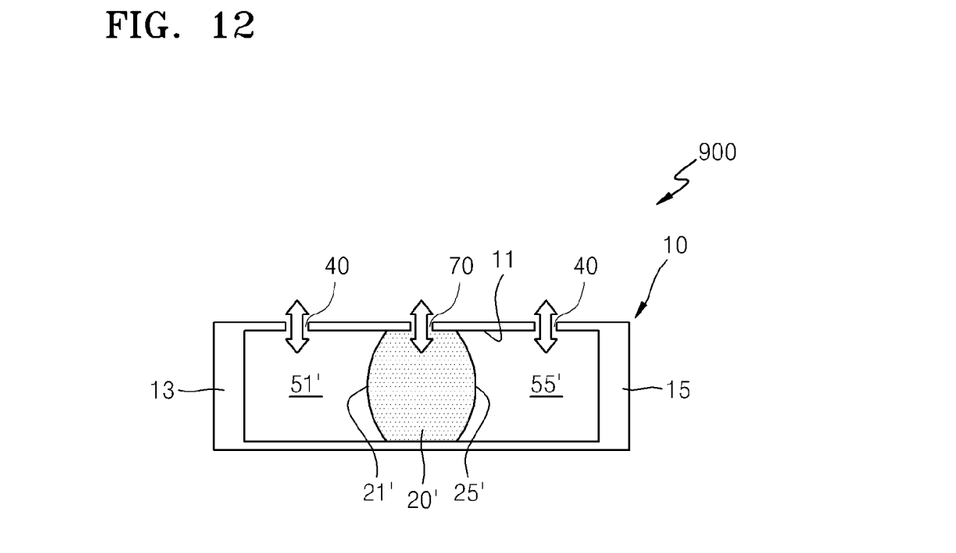
Figure 13:
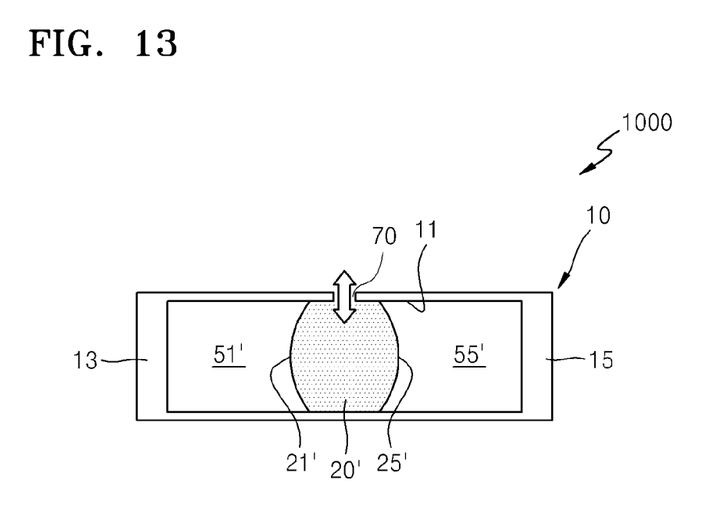

For example, as shown in FIGS. 11 to 13, one liquid lens 20' may be prepared in the lens barrel 10. FIGS. 11 to 13 show cases of the liquid lens 20' being a convex lens according to various exemplary embodiments. However, this is merely an example, and the liquid lens 20' may have various other lens shapes, such as a concave lens.

A variable liquid lens system 800 of FIG. 11 has a constitution corresponding to the variable liquid lens system 1 of FIG. 1. FIG. 11 shows an example in which first holes 40 are formed in the lens barrel 10 so that the amounts of the fluid in a space 51' between one lens surface 21' of the single liquid lens 20' and the first end 13 of the lens barrel 10 and a space 55' between the other lens surface 25' of the single liquid lens 20' and the second end 15 of the lens barrel 10 are adjusted, and the position of the liquid lens 20' is adjusted accordingly.

Compared to the variable liquid lens system 800 of FIG. 11, a variable liquid lens system 900 of FIG. 12 is an example in which not only the first holes 40 but also a second hole 70 are formed in the lens barrel 10 so that the position of the liquid lens 20' may be adjusted by adjusting the amounts of the fluid in the spaces 51' and 55', and also the distance between the two lens surfaces 21' and 25' may be adjusted by adding or subtracting the liquid to or from the liquid lens 20'.

Compared to the variable liquid lens system 900 of FIG. 12, a variable liquid lens system 1000 of FIG. 13 is an example in which only the second hole 70 is formed in the lens barrel 10 without the first holes 40 so that the distance between the two lens surfaces 21' and 25' may be adjusted by adding or subtracting the liquid to or from the liquid lens 20'. As in FIGS. 11 to 13, when the single liquid lens 20' is prepared, and the position of the liquid lens 20' and/or the distance between the two lens surfaces 21' and 25' of the liquid lens 20' is adjusted, the focuses of the variable liquid lens systems 800, 900, and 1000 may vary accordingly. Here, the structures of FIGS. 11 to 13 may further include the aforementioned electrode 60 on the wall 11 of the lens barrel 10 so that the curvature of the liquid lens 20' is changed according to the electrowetting principle. Also, FIGS. 11 to 13 show cases where the wall 11 of the lens barrel 10 has a parallel structure. However, even in a structure including the one liquid lens 20', the wall 11 of the lens barrel 10 may be formed into the aforementioned non-parallel structure to change the curvature of the liquid lens 20', and/or the electrode 60 may be further prepared on the wall 11 of the lens barrel 10 to change the curvature of the liquid lens 20' according to the electrowetting principle.

Variable liquid lens systems according to the various exemplary embodiments have been described above with reference to FIGS. 1 to 13, but a variable liquid lens system according to an exemplary embodiment may be modified in various other ways.

In the variable liquid lens systems according to one or more exemplary embodiments, the wall 11 inside the lens barrel 10 may be appropriately subjected to surface treatment so that a contact angle between the wall 11 inside the lens barrel 10 and a droplet may be determined and a liquid lens having the desired contact angle may be formed. When an electrode is further included, the contact angle between the droplet and the wall 11 may be changed according to the electrowetting principle by applying a voltage between the liquid lens consisting of the droplet and the electrode pattern. In addition, when the size of an internal cross-section of the lens barrel 10 is caused to vary in the length direction, the curvature of the liquid lens may be changed by moving the liquid lens.

When there are two or more droplets, that is, two or more liquid lenses apart from each other, inside the lens barrel 10, through channels which are open to the outside of the lens barrel 10, that is, first holes, may be present between the liquid lenses and in front of and/or behind a liquid lens, and the positions and relative positions of the liquid lenses may be changed by the flow of gas, such as air, or liquid which has not been mixed with the liquid of the liquid lenses through the through channels.

In this way, a liquid lens may be driven by air pressure or hydraulic pressure, and the air pressure or hydraulic pressure may be controlled by a motor pump connected through the outer wall of the lens barrel 10.

For a variable liquid lens system according to an exemplary embodiment, a flow path may be formed by the outer wall of the lens barrel 10, the flow path space of the fluid, and the outer wall of a structure in which the lens barrel 10 is installed. Here, the outer wall of the lens barrel 10 may involve processing for the flow path through which pneumatic air (gas) and hydraulic liquid (e.g., water pressure) flow.

As described above, according to the one or more exemplary embodiments, a liquid lens consisting of a droplet is formed in a lens barrel of a variable liquid lens system, and thus a plurality of liquid lens groups may be manufactured at the same time. Also, there is no need to use a material, such as a variable membrane, and thus the characteristic of light transmission may be improved. However, this is only an example, an a material, such as a variable membrane may be used.

Furthermore, since the variable focus or zooming function may be performed by using as little fluid or liquid as possible, the size of a fluid or liquid storage may be reduced as much as possible. Therefore, a portion occupied by a driving device may be reduced as much as possible, and the variable liquid lens system may be manufactured to have a small size. In other words, since there is no need to place the fluid or liquid storage in a cross-sectional area of the variable liquid lens system, a channel with the smallest cross-section may be established in a vertical direction, and electrode wires may be excluded when no electrowetting method is applied. In addition, there is no need for a mechanical structure for adjusting the distance between liquid lenses.

A variable liquid lens system according to an exemplary embodiment has at least one liquid lens consisting of a droplet in a lens barrel. Therefore, by adjusting the hydraulic pressures or air pressures of respective spaces, the position of the at least one liquid lens may be adjusted to change a focus, or by adding or subtracting liquid to or from the liquid lens, the distance between the two lens surfaces of the liquid lens may be adjusted to change the focus. When a plurality of liquid lenses are positioned apart from each other in the lens barrel, the variable liquid lens system according to one or more exemplary embodiments may perform the zooming function as well as the variable focus function through adjustment of the distance between the plurality of liquid lenses. In addition, the variable liquid lens system may be miniaturized by reducing an area occupied by a driving device as much as possible.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A variable liquid lens system comprising:
a lens barrel comprising a wall and first and second ends, wherein the first and second ends are substantially transparent;
a first liquid lens disposed in the lens barrel and contacting the wall at a first liquid lens contact point, and a second liquid lens disposed in the lens barrel and contacting the wall at a second liquid lens contact point, each of the first liquid lens and the second liquid lens comprising a droplet;
a plurality of spaces containing fluid and positioned on opposite sides of each of the first liquid lens and the second liquid lens inside the lens barrel, the plurality of spaces comprising a first space positioned inside the lens barrel between the first liquid lens and the first end, a second space positioned inside the lens barrel between the first and second liquid lenses, and a third space positioned inside the lens barrel between the second liquid lens and the second end; and
an electrode comprising at least one of a first electrode disposed at a portion of the wall corresponding to the first liquid lens and a second electrode disposed at a portion of the wall corresponding to the second liquid lens,
wherein a plurality of first holes are provided in the wall at positions corresponding to the plurality of spaces, the plurality of first holes comprising a first hole corresponding to the first space, a second hole corresponding to the second space, and a third hole corresponding to the third space,
an optical axis of the variable liquid lens system intersects the first liquid lens and the second liquid lens,
at least one of the first liquid lens contact point and the second liquid lens contact point along the wall of the lens barrel is movable by adjusting amounts of the fluid contained in the first space, the second space and the third space via the plurality of first holes so that a distance between the first liquid lens and the second liquid lens is changed, and
a curvature of at least one of the first liquid lens and the second liquid lens is changed according to a voltage applied to the electrode.

2. The variable liquid lens system of claim 1, wherein, during adjustment of the positions of the first and second liquid lenses, a sum of variances in amounts of the fluid contained in the first, second and third spaces is controlled to be substantially zero, and
light incident on the variable liquid lens sequentially encounters the first space, the first liquid lens, the second space, the second liquid lens and the third space.

3. The variable liquid lens system of claim 1, wherein, during adjustment of the positions of the first and second liquid lenses, a sum of variances in volumes of the first, second and third spaces is controlled to be substantially zero.

4. The variable liquid lens system of claim 1, wherein the first and second liquid lenses comprise different types of liquid.

5. The variable liquid lens system of claim 1, wherein the first and second liquid lenses comprise a different type of fluid than the fluid contained in the first, second and third spaces.

6. The variable liquid lens system of claim 1, wherein the wall has a non-parallel wall area so that a curvature of the first liquid lens is changed during adjustment of the positions of the first liquid lens.

7. The variable liquid lens system of claim 6, further comprising an electrode at a portion of the wall corresponding to the first liquid lens,
wherein the first liquid lens is configured so the curvature of the first liquid lens is changed according to an electrowetting principle.

8. The variable liquid lens system of claim 1, wherein the first liquid lens comprises a fluid that is different than the fluid filling the spaces.

9. The variable liquid lens system of claim 1, wherein the wall has a parallel-wall structure.

10. The variable liquid lens system of claim 1, wherein the lens barrel has a combined shape of two or more truncated cones, and
the optical axis of the variable liquid lens system intersects a base of at least one of the two or more truncated cones.

11. The variable liquid lens system of claim 1, wherein the wall has a non-parallel wall area so that a curvature of the first liquid lens is changed during adjustment of the position of the first liquid lens.

12. The variable liquid lens system of claim 11, further comprising an electrode at a portion of the wall corresponding to the first liquid lens,
wherein the first liquid lens is configured so that the curvature of the first liquid lens is changed according to an electrowetting principle.

13. The variable liquid lens system of claim 1, wherein the wall comprises a first non-parallel wall area and a second non-parallel wall area, and
a first diameter of the first end of the lens barrel and a second diameter of the second end of the lens barrel are greater than a third diameter of the lens barrel between the first and second ends of the lens barrel.

14. A variable liquid lens system comprising:
a lens barrel comprising a wall and first and second ends, wherein the first and second ends are substantially transparent;
a first liquid lens and a second liquid lens disposed in the lens barrel and contacting the wall, each of the first liquid lens and the second liquid lens comprising a droplet;
a plurality of spaces positioned on opposite sides of the each of the first liquid lens and the second liquid lens inside the lens barrel, the plurality of spaces comprising a first space positioned inside the lens barrel between the first liquid lens and the first end, a second space positioned inside the lens barrel between the first and second liquid lenses, and a third space positioned inside the lens barrel between the second liquid lens and the second end;
a plurality of first holes provided in the wall, the plurality of first holes comprising a first hole corresponding to the first space, a second hole corresponding to the second space, and a third hole corresponding to the third space; and
an electrode comprising at least one of a first electrode disposed at a portion of the wall corresponding to the first liquid lens and a second electrode disposed at a portion of the wall corresponding to the second liquid lens,
wherein at least one lens hole is provided in the wall at a position corresponding to the first liquid lens,
an optical axis of the variable liquid lens system intersects the first liquid lens and the second liquid lens,
a distance along the wall of the lens barrel between a first liquid lens contact point where the first liquid lens contacts the wall and a second liquid lens contact point where the second liquid lens contacts the wall is movable by adding or subtracting liquid to or from the first liquid lens via the at least one lens hole so that the distance between the first liquid lens and the second liquid lens is changed, and a curvature of at least one of the first liquid lens and the second liquid lens is changed according to a voltage applied to the electrode.

15. A variable liquid lens system comprising:

a lens barrel comprising first and second ends;

a first liquid lens and a second liquid lens inside the lens barrel, each of the first liquid lens and the second liquid lens comprising a droplet;

a plurality of spaces positioned between the first and second liquid lenses, and the first and second ends of the lens barrel, the plurality of spaces comprising a first space positioned inside the lens barrel between the first liquid lens and the first end, a second space positioned inside the lens barrel between the first and second liquid lenses, and a third space positioned inside the lens barrel between the second liquid lens and the second end;

a plurality of holes provided in the wall corresponding to the plurality of spaces, the plurality of holes comprising a first hole corresponding to the first space, a second hole corresponding to the second space, and a third hole corresponding to the third space; and an electrode comprising at least one of a first electrode disposed at a portion of the wall corresponding to the first liquid lens and a second electrode disposed at a portion of the wall corresponding to the second liquid lens, wherein hydraulic pressure or air pressure of each of the plurality of spaces is configured to be adjusted by adjusting an amount of fluid contained in the first space using a corresponding hole of the plurality of holes, an optical axis of the variable liquid lens system intersects the first liquid lens and the second liquid lens, at least one of a contact position of the first liquid lens and a contact position of the second liquid lens along an inner surface of the lens barrel are movable based on adjustment of the hydraulic pressure or air pressure of the first space, the second space and the third space so that a distance between the first liquid lens and the second liquid lens is changed, and a curvature of at least one of the first liquid lens and the second liquid lens is changed according to a voltage applied to the electrode.

* * * * *